(12) United States Patent
Tsai et al.

(10) Patent No.: US 10,935,094 B2
(45) Date of Patent: Mar. 2, 2021

(54) WEAR WARNING DEVICE AND WARNING SYSTEM

(71) Applicant: TEKTRO TECHNOLOGY CORPORATION, Changhua County (TW)

(72) Inventors: Szu-Fang Tsai, Changhua County (TW); Yu-Ming Huang, Changhua County (TW); Pao-Wen Lin, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 64 days.

(21) Appl. No.: 16/420,327

(22) Filed: May 23, 2019

(65) Prior Publication Data

US 2019/0376572 A1 Dec. 12, 2019

(30) Foreign Application Priority Data

Jun. 6, 2018 (TW) .................................. 107119415

(51) Int. Cl.
*F16D 66/02* (2006.01)
*B60T 17/22* (2006.01)
*F16D 55/00* (2006.01)

(52) U.S. Cl.
CPC ............ *F16D 66/026* (2013.01); *B60T 17/22* (2013.01); *F16D 66/025* (2013.01); *F16D 2055/0016* (2013.01)

(58) Field of Classification Search
CPC ...... F16D 66/02; F16D 66/021; F16D 66/022; F16D 66/023; F16D 66/024;

(Continued)

(56) References Cited

U.S. PATENT DOCUMENTS

| 3,670,300 A | * | 6/1972 | Depenheuer | .......... F16D 66/023 |
| | | | | 340/454 |
| 3,675,197 A | * | 7/1972 | Bennett | ................. F16D 66/022 |
| | | | | 340/454 |

(Continued)

FOREIGN PATENT DOCUMENTS

| DE | 7008401 U | * | 7/1970 | ........... F16D 66/021 |
| DE | 2743868 A1 | * | 4/1978 | ........... F16D 66/023 |

(Continued)

OTHER PUBLICATIONS

EPO machine translation; DE 2743868; Apr. 1978. (Year: 1978).*

*Primary Examiner* — Thomas J Williams
(74) *Attorney, Agent, or Firm* — Locke Lord LLP; Tim Tingkang Xia, Esq.

(57) ABSTRACT

The disclosure provides a wear warning device including a caliper, two brake pads, an elastic component and a first switch. The caliper has two push parts. The two push parts are respectively disposed at a first wall surface and a second wall surface of the caliper. The brake pads are located between the two push parts. The elastic component includes two arm parts and a connection part located between the arm parts. The arm parts are respectively disposed on the brake pads. The first switch is located between the arm parts. When the brake pads are in a worn-out state and the push parts are moved toward each other to force the brake pads to clamp a brake disk and to force the two arm parts to move toward each other, one of the arm parts activates the first switch to produce a wear warning signal.

19 Claims, 12 Drawing Sheets

(58) Field of Classification Search
CPC .............. F16D 66/026; F16D 66/027; F16D 2055/0016; F16D 55/02; F16D 55/10; F16D 55/18; F16D 55/22; F16D 55/228; B62L 3/02; B62L 3/023
USPC ........................................................ 188/26
See application file for complete search history.

(56) References Cited

U.S. PATENT DOCUMENTS

| | | | | |
|---|---|---|---|---|
| 3,716,113 | A * | 2/1973 | Kobayashi | F16D 66/024 |
| | | | | 188/1.11 R |
| 3,986,164 | A * | 10/1976 | Hirai | F16D 55/228 |
| | | | | 340/454 |
| 4,491,204 | A * | 1/1985 | Dirauf | F16D 65/097 |
| | | | | 116/208 |
| 2013/0192933 | A1* | 8/2013 | King | B60T 17/221 |
| | | | | 188/1.11 L |
| 2015/0129373 | A1* | 5/2015 | Hirotomi | B62L 3/00 |
| | | | | 188/73.31 |
| 2016/0208873 | A1* | 7/2016 | Kuo | B60T 17/22 |

FOREIGN PATENT DOCUMENTS

| | | | | | |
|---|---|---|---|---|---|
| GB | 1384492 | A | * | 2/1975 | ........... F16D 66/024 |
| JP | 55119237 | A | * | 9/1980 | ........... F16D 66/021 |

* cited by examiner

WEAR WARNING DEVICE AND WARNING SYSTEM

CROSS-REFERENCE TO RELATED APPLICATIONS

This non-provisional application claims priority under 35 U.S.C. § 119(a) on Patent Application No(s). 107119415 filed in Taiwan, R.O.C on Jun. 6, 2018, the entire contents of which are hereby incorporated by reference.

TECHNICAL FIELD

The disclosure relates to a wear warning device and a warning system, more particularly a wear warning device and a warning system that have a switch can be activated as brake pads are worn to a certain degree.

BACKGROUND

In recent years, road bikes, mountain bikes and other types of bikes become more and more popular so that the manufacturers pay more attention on developing new and market-oriented products in order to provide costumers a better riding experience and a more stylish appearance of bicycle. However, in the safety aspect, the conventional bikes in the market still need to be improved.

Brake system is one of the most important factors to the bicycle safety. The caliper is the most commonly used means in the brake system. The caliper is disposed near a brake disk which is rotatable with a bicycle wheel, and it is able to clamp the brake disk to stop the rotation of the bicycle wheel via brake pads disposed on the caliper.

SUMMARY OF THE INVENTION

One embodiment of the disclosure provides a wear warning device configured to be disposed near a brake disk. The wear warning device includes a caliper, two brake pads, an elastic component and a first switch. The caliper has an accommodation space, a first wall surface, a second wall surface and two push parts. The first wall surface and the second wall surface are located on two opposite sides of the accommodation space, and the two push parts are respectively disposed at the first wall surface and the second wall surface and are movable close to or away from each other. The two brake pads are located in the accommodation space and located between the two push parts. The two brake pads have a non-worn-out state or a worn-out state. The elastic component includes a first arm part, a connection part and a second arm part. The connection part is connected to and located between the first arm part and the second arm part, and the first arm part and the second arm part are respectively disposed on the two brake pads. The first switch is disposed on the first arm part and located between the first arm part and the second arm part. When the two brake pads are in the non-worn-out state and the two push parts are moved toward each other to force the two brake pads to clamp the brake disk and to force the first arm part and the second arm part to move toward each other, the second arm part does not activate the first switch to produce a wear warning signal. When the two brake pads are in the worn-out state and the two push parts are moved toward each other to force the two brake pads to clamp the brake disk and to force the first arm part and the second arm part to move toward each other, the second arm part activates the first switch to produce the wear warning signal.

Another embodiment of the disclosure provides a warning system. The warning system includes a brake lever and the aforementioned wear warning device. The brake lever has a wear warning lamp. The first switch of the wear warning device is electrically connected to the wear warning lamp.

Still another embodiment of the disclosure provides a warning system. The warning system includes a brake lever and the aforementioned wear warning device. The brake lever has a wear warning lamp and a brake lamp. The first switch of the wear warning device is electrically connected to the wear warning lamp, and a second switch of the wear warning device is electrically connected to the brake lamp.

Yet another embodiment provides a wear warning device configured to be disposed near a brake disk. The wear warning device includes a caliper, two brake pads, an elastic component and a first switch. The caliper has an accommodation space, a first wall surface, a second wall surface and two push parts. The first wall surface and the second wall surface are respectively located on two opposite sides of the accommodation space, and the two push parts are respectively disposed at the first wall surface and the second wall surface and are movable close to or away from each other. The two brake pads are located in the accommodation space and located between the two push parts. The elastic component includes a first arm part, a connection part and a second arm part. The connection part is connected to and located between the first arm part and the second arm part, and the first arm part and the second arm part are respectively disposed on the two brake pads. The first switch is disposed on the first arm part and located between the first arm part and the second arm part. When the push parts are moved toward each other to force the two brake pads to clamp the brake disk and to force the first arm part and the second arm part to move toward each other, the second arm part activates the first switch to produce a signal.

Still yet another embodiment of the disclosure provides a wear warning device configured to be disposed near a brake disk. The wear warning device an elastic component and a first switch. The elastic component includes a first arm part, a connection part and a second arm part. The connection part is connected to and located between the first arm part and the second arm part. The first arm part includes a first extension arm portion and a first plate portion connected to each other, and the second arm part includes a second extension arm portion and a second plate portion connected to each other. Two opposite ends of the first plate portion are respectively connected to the first extension arm portion and the connection part, and two opposite ends of the second plate portion are respectively connected to the second extension arm portion and the connection part. The first plate portion has a fixing structure. The first switch is disposed on the fixing structure. When the first arm part and the second arm part are moved toward each other, the second plate portion of the second arm part activates the first switch to produce a signal.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
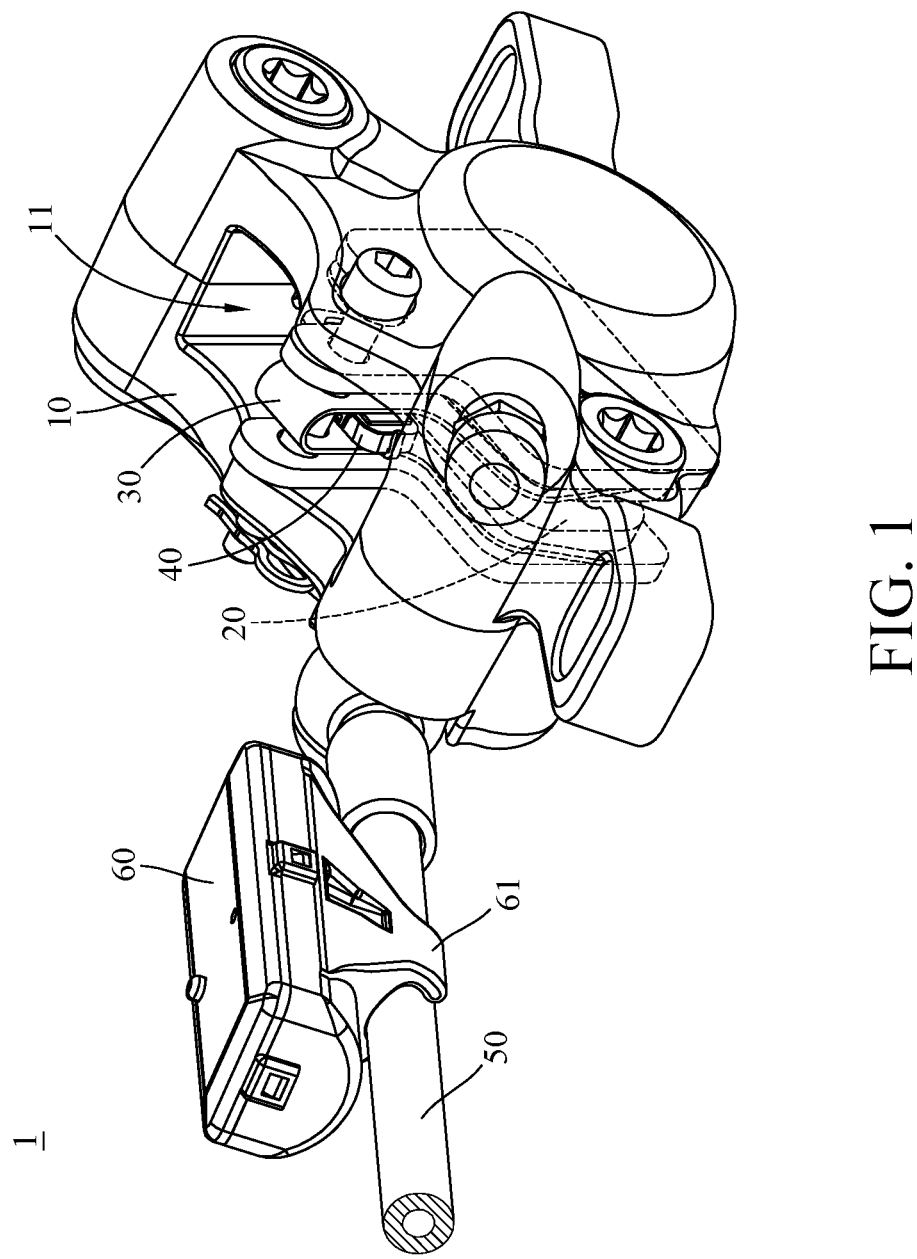
FIG. 1 is a perspective view of a wear warning device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
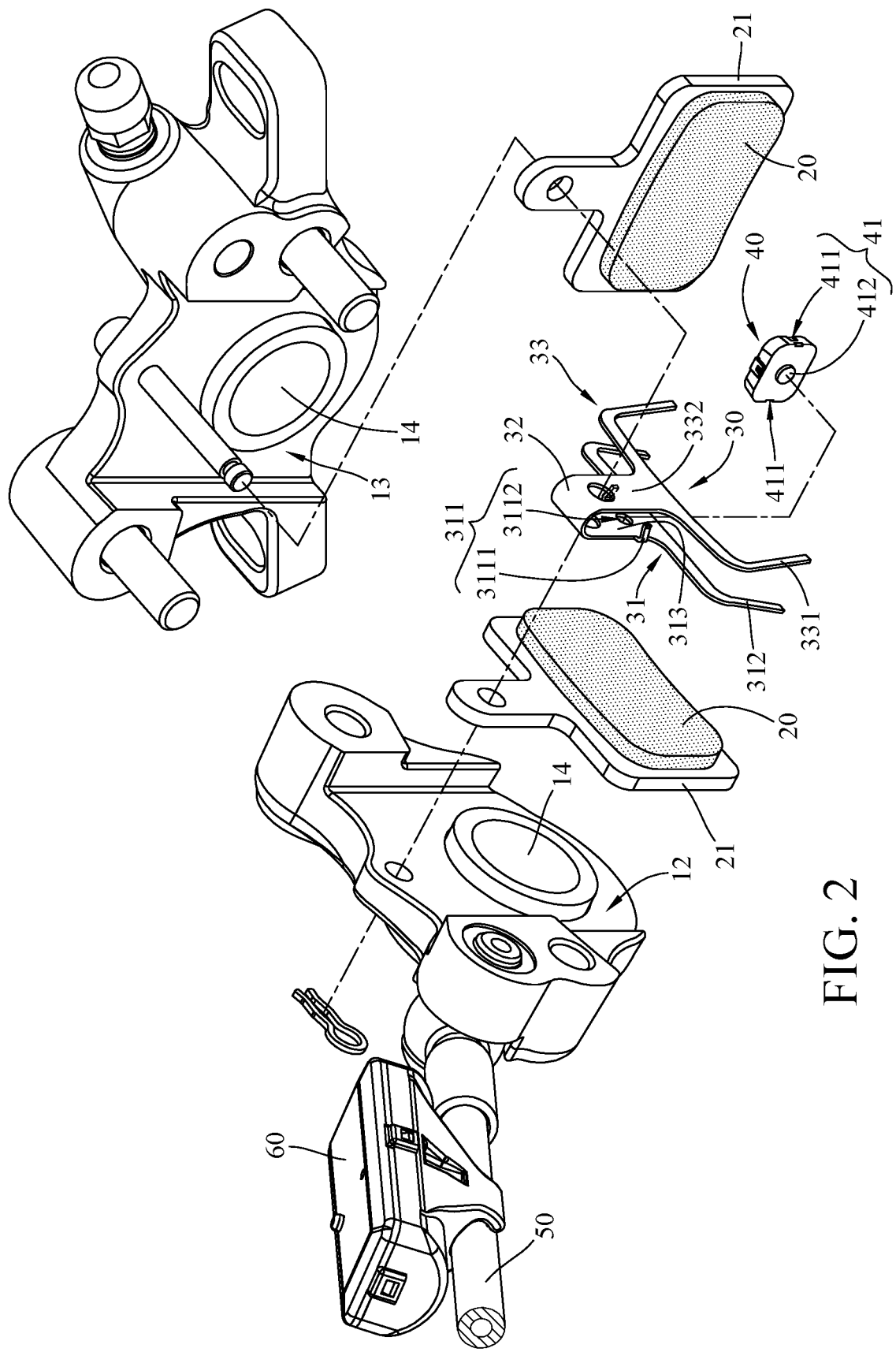
FIG. 2 is a partial exploded view of the wear warning device in FIG. 1.
Figure 3:
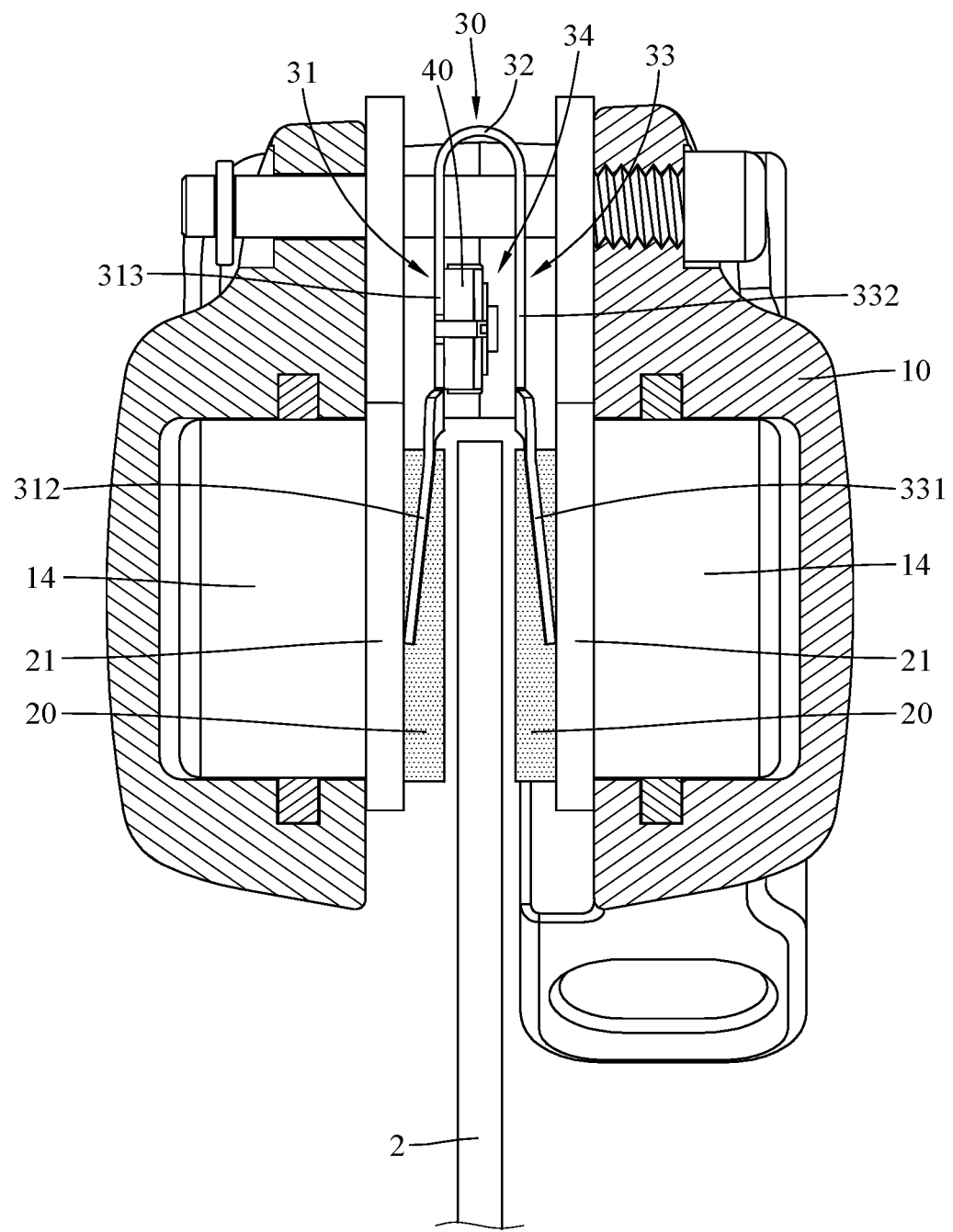
FIG. 3 is a partial cross-sectional view of a brake disk and the wear warning device in FIG. 1.

Please refer to FIGS. 1 to 3. FIG. 1 is a perspective view of a wear warning device according a first embodiment of the disclosure. FIG. 2 is a partial exploded view of the wear warning device in FIG. 1. FIG. 3 is a partial cross-sectional view of a brake disk and the wear warning device in FIG. 1.

This embodiment provides a wear warning device 1, and the wear warning device 1 is disposed near, for example, a brake disk 2 (shown in FIG. 3). The brake disk 2 is configured to be disposed on a bicycle wheel and rotated with it. The wear warning device 1 includes a caliper 10, two brake pads 20, an elastic component 30, a first switch 40, an oil inlet tube 50 and a wireless transmission device 60.

The caliper 10 has an accommodation space 11, a first wall surface 12, a second wall surface 13 and two push parts 14. The first wall surface 12 and the second wall surface 13 are respectively located on two opposite sides of the accommodation space 11, and the two push parts 14 are respectively disposed on the first wall surface 12 and the second wall surface 13 and movable close to or away from each other.

The two brake pads 20 are located in the accommodation space 11 and are located between the two push parts 14, and the two brake pads 20 has a non-worn-out state or a worn-out state. In detail, the two brake pads 20 are respectively disposed on two pad carriers 21, and the brake pad 20 is smaller than the pad carrier 21. The two brake pads 20 are located between the two pad carriers 21, and the two pad carriers 21 are configured to be respectively moved by the two push parts 14. In addition, the thickness of the brake pad 20 as it is in the non-worn-out state is larger than that in the worn-out state.

The elastic component 30 includes a first arm part 31, a connection part 32 and a second arm part 33, and two opposite ends of the connection part 32 are respectively connected to the first arm part 31 and the second arm part 33. The first arm part 31 and the second arm part 33 are respectively disposed on the two brake pads 20. The first arm part 31 has a fixing structure, such as a first engagement structure 311. The first engagement structure 311 includes two positioning pawls 3111 and a positioning hole 3112. The two positioning pawls 3111 extend toward the second arm part 33, and the positioning hole 3112 is located between the two positioning pawls 3111. In detail, the first arm part 31 includes a first extension arm portion 312 and a first plate portion 313 connected to each other, and the second arm part 33 includes a second extension arm portion 331 and a second plate portion 332 connected to each other. Two opposite ends of the first plate portion 313 are respectively connected to the first extension arm portion 312 and the connection part 32, and two opposite ends of the second plate portion 332 are respectively connected to the second extension arm portion 331 and the connection part 32. The first extension arm portion 312 and the second extension arm portion 331 are, for example, respectively disposed on the peripheries of the two brake pads 20 and in contact with the two pad carriers 21. The first engagement structure 311 is, for example, located on the first plate portion 313 of the first arm part 31.

In this embodiment, the first plate portion 313 and the second plate portion 332 faces each other and form an inner area 34 therebetween. The first switch 40 is located in the inner area 34 and disposed on the first engagement structure 311 of the first plate portion 313. In specific, the first switch 40 has a fixing structure, such as a second engagement structure 41. The second engagement structure 41 includes two positioning recesses 411 and a positioning protrusion 412 located between the two positioning recesses 411. The two positioning pawls 3111 of the first engagement structure 311 can be respectively engaged with the two positioning recesses 411, and the positioning protrusion 412 of the second engagement structure 41 can be inserted into the positioning hole 3112 of the first engagement structure 311.

In this embodiment, the first switch 40 is fixed on the first plate portion 313 of the first arm part 31 via the first engagement structure 311 and the second engagement structure 41, but the present disclosure is not limited thereto; in some other embodiments, the first switch may be fixed to the first plate portion of the first arm part by adhesive.

The oil inlet tube 50 is connected to the caliper 10, and the oil inlet tube 50 is configured to transmit brake oil to the caliper 10 in order to move the two push part 14 toward each other. In this embodiment, the wireless transmission device 60 is, for example, a Bluetooth transmission device. The wireless transmission device 60 has a mount portion 61. The wireless transmission device 60 can be mounted on the oil inlet tube 50 via the mount portion 61. The first switch 40 is electrically connected to the wireless transmission device 60.

Then, the following paragraphs will illustrate how the wear warning device 1 warns a user when the brake pads 20 are about to be or have been worn out. Please refer to FIGS. 4 and 5, FIG. 4 is a partial cross-sectional view of the wear warning device in FIG. 3 when brake pads in a non-worn-out state clamp the brake disk, and FIG. 5 is a partial cross-sectional view of the wear warning device in FIG. 3 when the brake pads in a worn-out state clamp the brake disk.

Figure 4:
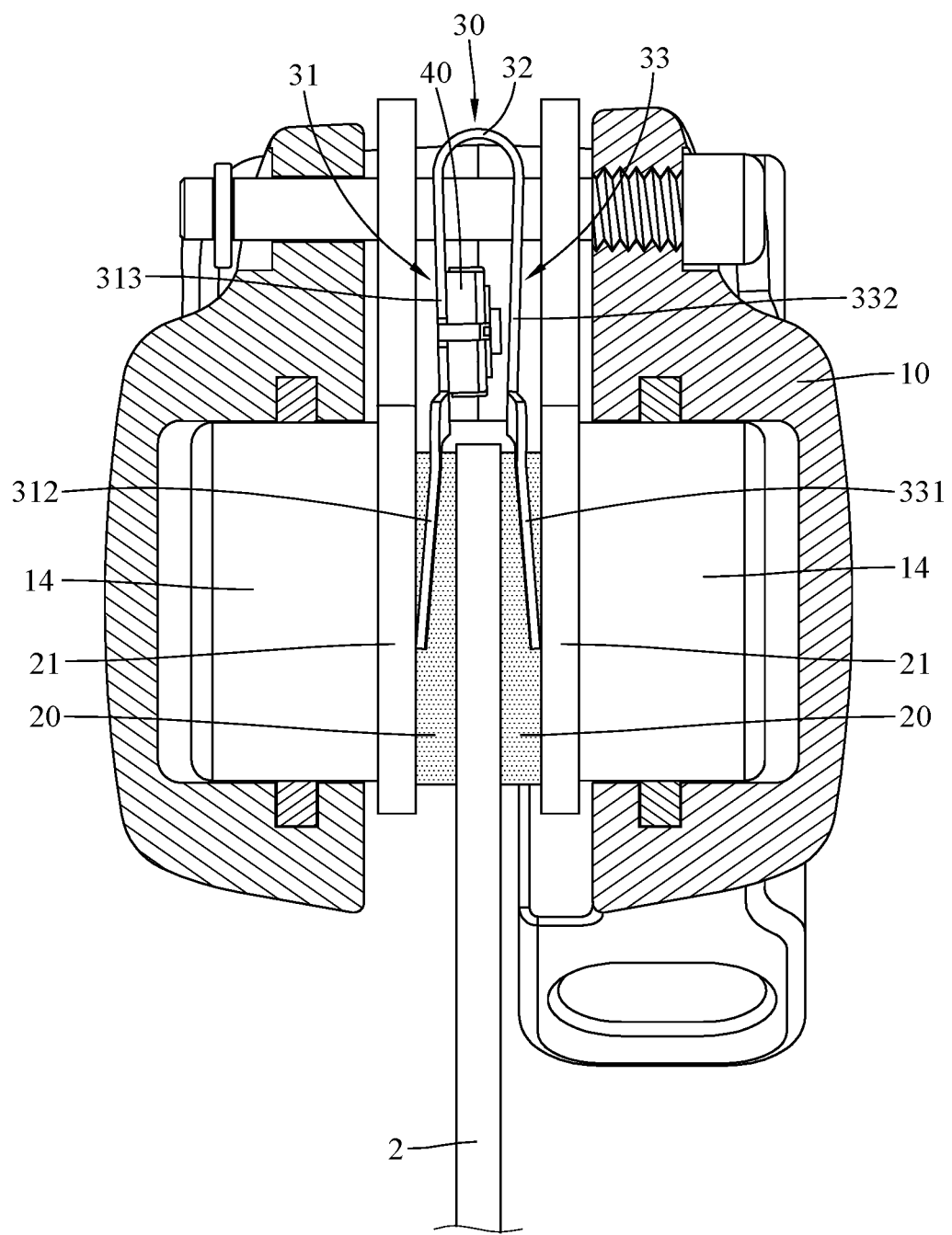
FIG. 4 is a partial cross-sectional view of the wear warning device in FIG. 3 when brake pads in a non-worn-out state clamp the brake disk.

As shown in FIG. 4, during braking, the two push parts 14 are moved close to each other so as to move the brake pads 20 to clamp the brake disk 2, meanwhile, the first arm part 31 and the second arm part 33 will also be moved close to each other. In the case that the brake pads 20 are still in the non-worn-out state, the two brake pads 20 have sufficient thicknesses so that the second plate portion 332 of the second arm part 33 is unable to touch or activate the first switch 40.

Figure 5:
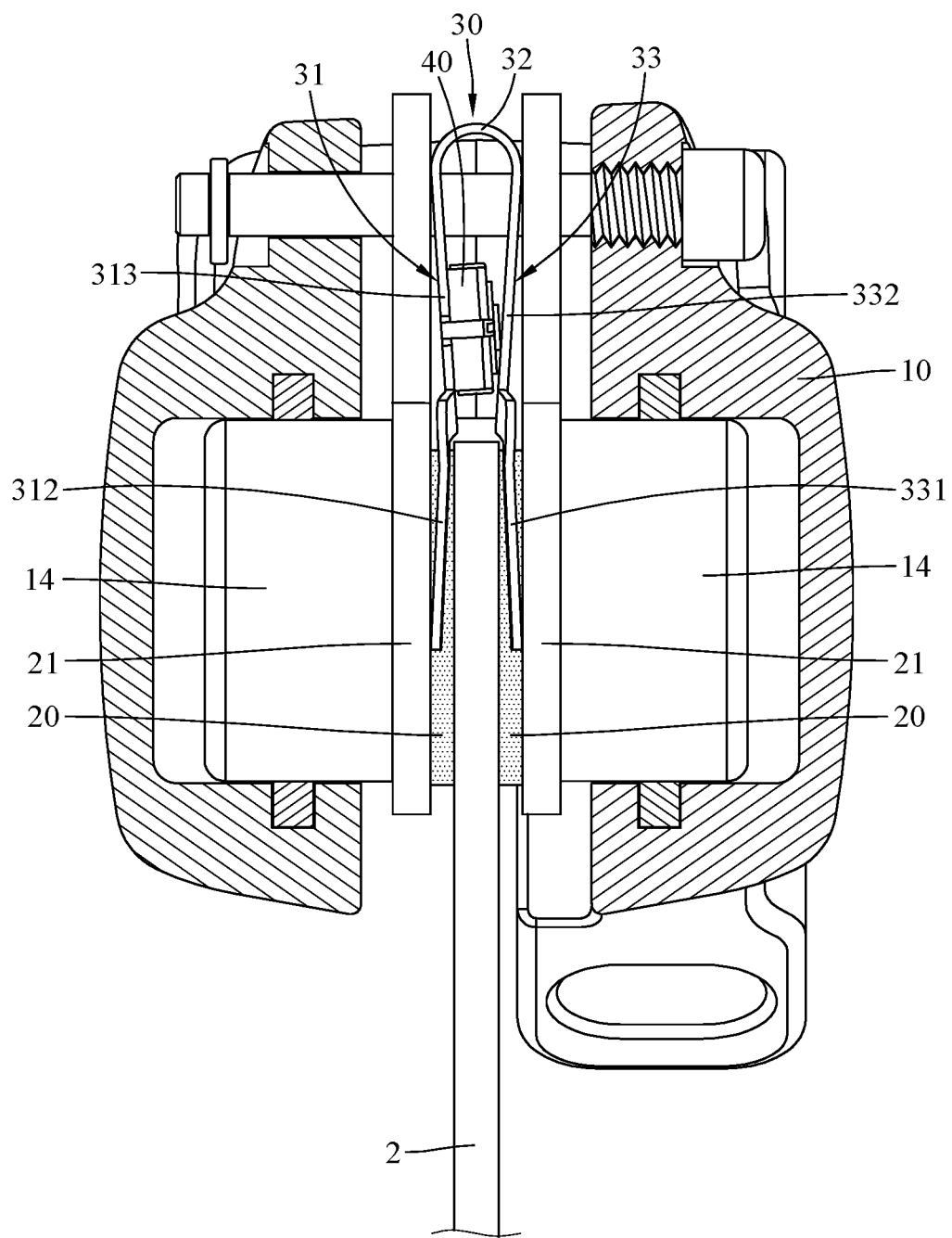
FIG. 5 is a partial cross-sectional view of the wear warning device in FIG. 3 when the brake pads in a worn-out state clamp the brake disk.

On the other hand, as shown in FIG. 5, in the case that the brake pads 20 had been worn for a long time, the brake pads 20 become thinner than before. As the thicknesses of the brake pads 20 down to a specific value, the brake pads 20 will be considered to be in the worn-out state. In such a case, the distance between the first arm part 31 and the second arm part 33 will be smaller during braking, such that the second plate portion 332 of the second arm part 33 is able to touch or press the first switch 40 and thus activating the first switch 40. When the first switch 40 is activated, it will produce a wear warning signal, and the wear warning signal is transmitted by the wireless transmission device 60 (shown in FIG. 1) to warn the user that the two brake pads 20 are about to be or have been worn out.

Figure 6:
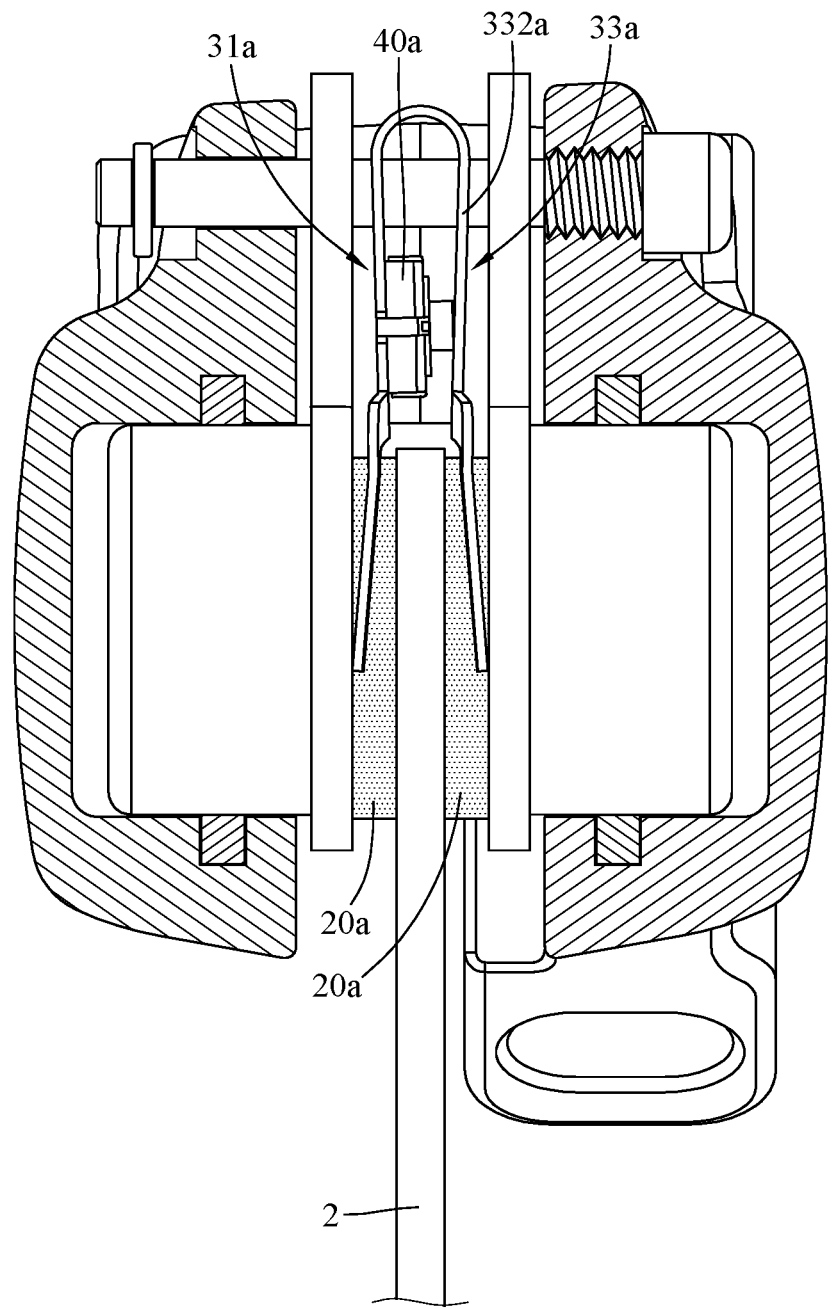
FIG. 6 is a partial cross-sectional view of a brake disk and a wear warning device according to a second embodiment of the disclosure when brake pads in a non-worn-out state clamp the brake disk.
Figure 7:
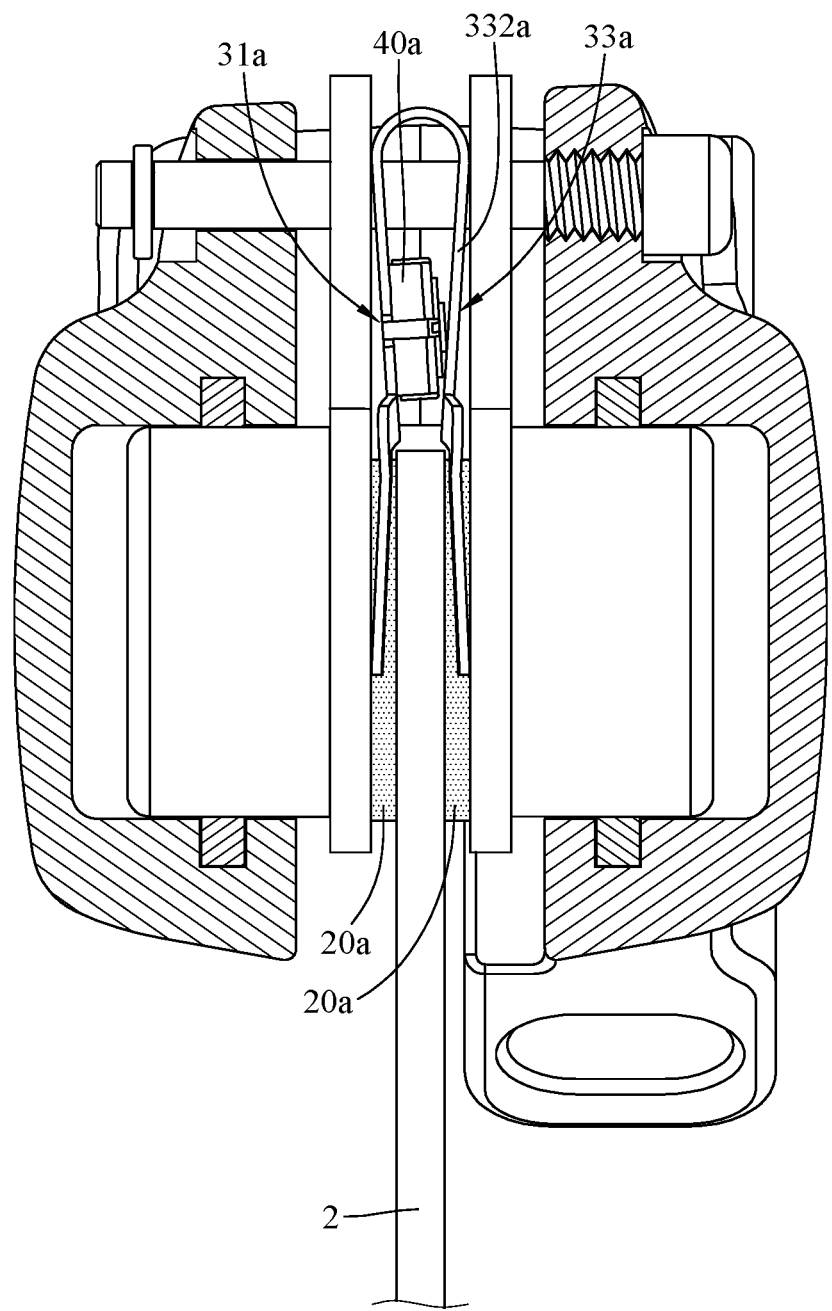
FIG. 7 is a partial cross-sectional view of the brake disk and the wear warning device in FIG. 6 when the brake pads in a worn-out state clamp the brake disk.

In the disclosure, the first switch 40 may have additional function. For example, please refer to FIGS. 6 and 7, FIG. 6 is a partial cross-sectional view of a brake disk and a wear warning device according to a second embodiment of the disclosure when brake pads in a non-worn-out state clamp the brake disk, and FIG. 7 is a partial cross-sectional view of the brake disk and the wear warning device in FIG. 6 when the brake pads in a worn-out state clamp the brake disk.

This embodiment provides a wear warning device similar to the wear warning device 1 of the previous embodiment. Therefore, only the differences between them will be described in the following sentences. In this embodiment, a first switch 40*a* of the wear warning device is a two-step switch. As shown in FIG. 6, when two brake pads 20*a* are in the non-worn-out state, a first arm part 31*a* and a second arm part 33*a* can be moved close to each other to cause a second plate portion 332*a* of the second arm part 33*a* to press the first switch 40*a*, but only the first step of the first switch 40*a* is performed. At this moment, the first switch 40*a* can produce a brake warning signal to turn on a brake lamp (not shown) of the bicycle for warning behind vehicles. In this or another embodiment, the brake warning signal may be transmitted to the brake lamp via the wireless transmission device (as shown in FIG. 1). As shown in FIG. 7, when the two brake pads 20*a* are in the worn-out state, the first arm part 31*a* and the second arm part 33*a* can be moved closer to each other due to the smaller thicknesses of the brake pads 20*a*. In such a case, the second plate portion 332*a* of the second arm part 33*a* will be able to press the first switch 40*a* harder to cause it to the second step. In the second step of the first switch 40*a*, it will produce a wear warning signal to warn the user.

Figure 8:
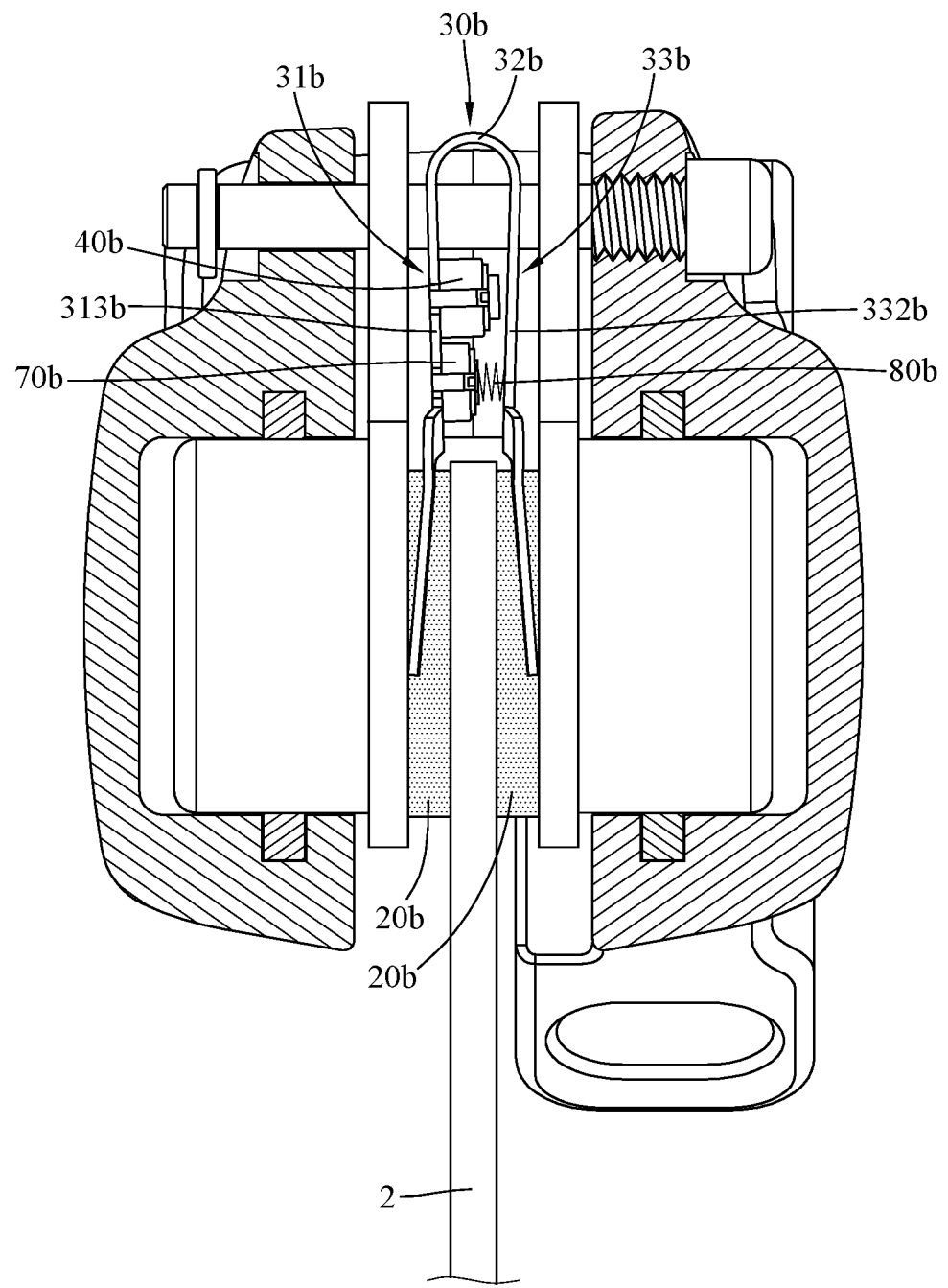
FIG. 8 is a partial cross-sectional view of a brake disk and a wear warning device according to a third embodiment of the disclosure when brake pads in a non-worn-out state clamp the brake disk.
Figure 9:
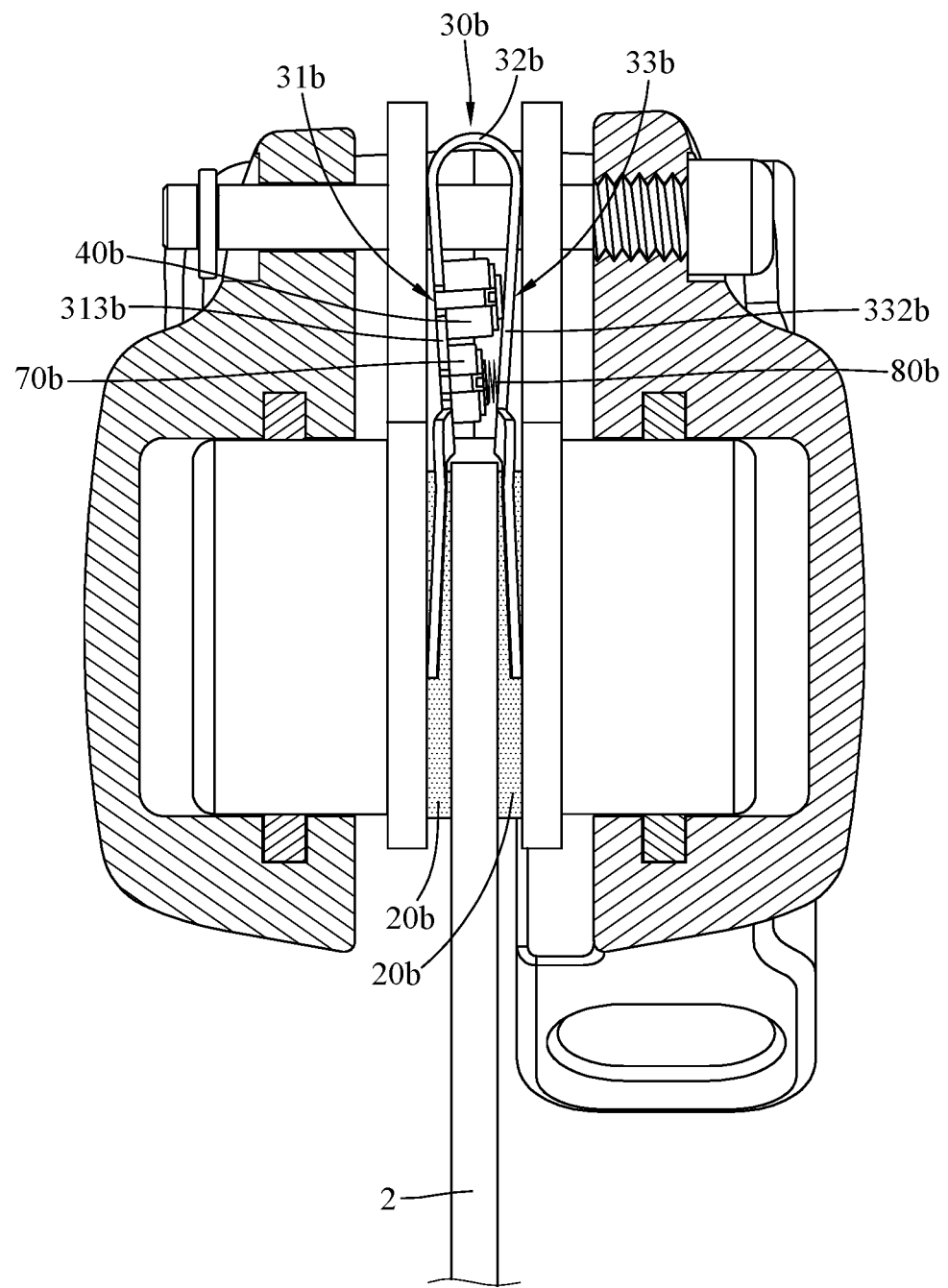
FIG. 9 is a partial cross-sectional view of the brake disk and the wear warning device in FIG. 8 when the brake pads in a worn-out state clamp the brake disk.

However, the disclosure is not limited by the above embodiments. Please refer to FIGS. 8 and 9, FIG. 8 is a partial cross-sectional view of a brake disk and a wear warning device according to a third embodiment of the disclosure when brake pads in a non-worn-out state clamp the brake disk. FIG. 9 is a partial cross-sectional view of the brake disk and the wear warning device in FIG. 8 when the brake pads in a worn-out state clamp the brake disk.

This embodiment provides a wear warning device similar to the wear warning device 1 of the previous embodiment. Therefore, only the differences between them will be described in the following sentences. In this embodiment, the wear warning device further includes a second switch 70*b* and an elastic contact component 80*b*. The second switch 70*b* is disposed on a first plate portion 313*b* of a first arm part 31*b* of an elastic component 30*b* and located between the first arm part 31*b* and a second arm part 33*b* of the elastic component 30*b*, and a first switch 40*b* is located closer to a connection part 32*b* of the elastic component 30*b* than the second switch 70*b*. The elastic contact component 80*b* is, for example, a spring. The elastic contact component 80*b* is disposed on a second plate portion 332*b* of the second arm part 33*b* and is located between the first arm part 31*b* and the second arm part 33*b*.

As shown in FIG. 8, when two brake pads 20*b* are in the non-worn-out state, the first arm part 31*b* and the second arm part 33*b* can be moved close to each other to cause the elastic contact component 80*b* to activate the second switch 70*b* to produce a brake warning signal. At this moment, two brake pads 20*b* respectively have sufficient thicknesses, such that the second plate portion 332*b* of the second arm part 33*b* is unable to touch or activate the first switch 40*b*. Then, as shown in FIG. 9, when the two brake pads 20*b* are in the worn-out state, the first arm part 31*b* and the second arm part 33*b* can be moved closer to each other due to the smaller thicknesses of the brake pads 20*b*. In such a case, the first switch 40*b* and the second switch 70*b* can be respectively activated by the second plate portion 332*b* of the second arm part 33*b* and the elastic contact component 80*b* to respectively produce a wear warning signal and the brake warning signal.

Figure 10:
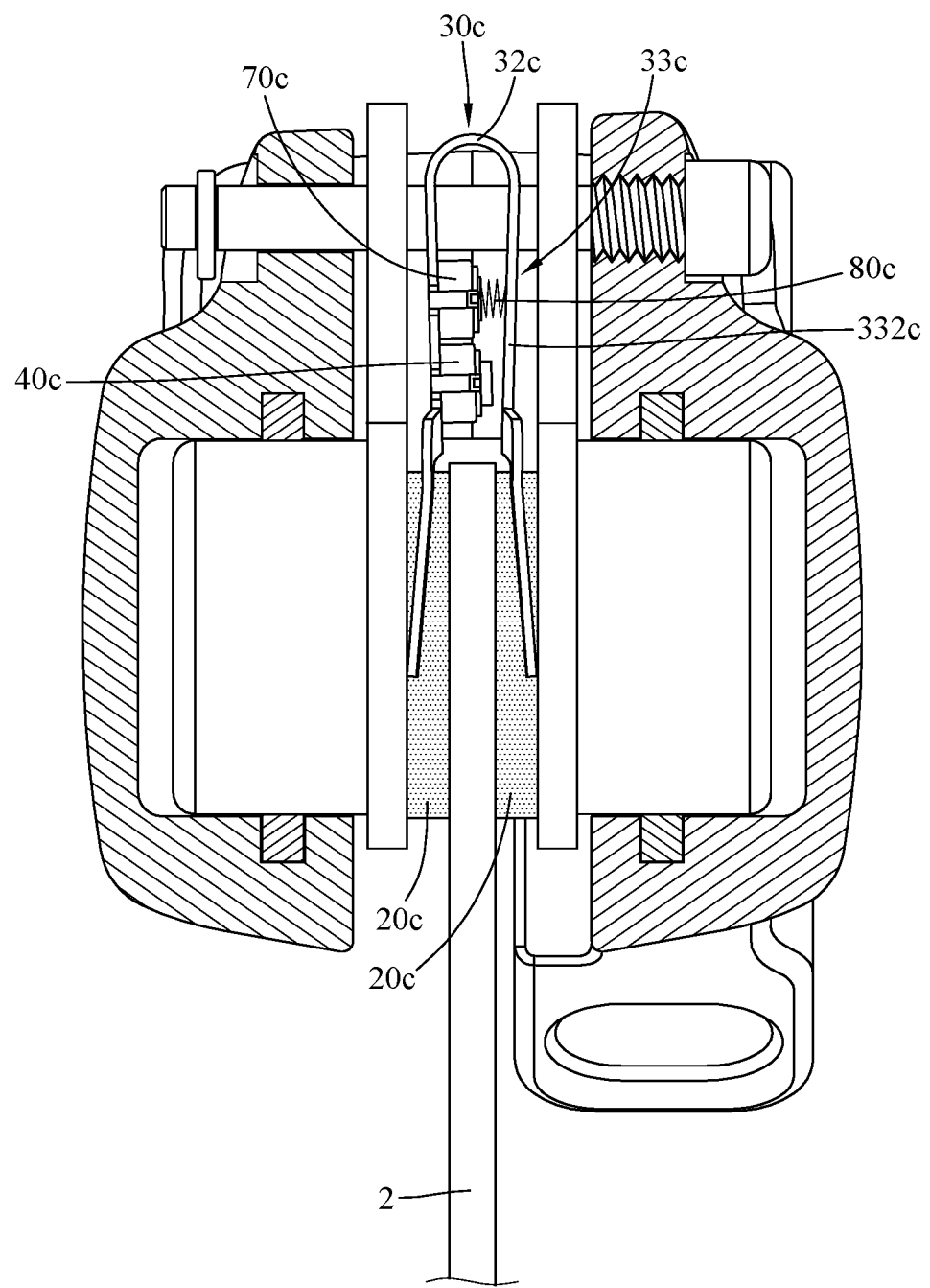
FIG. 10 is a partial cross-sectional view of a brake disk and a wear warning device according to a fourth embodiment of the disclosure when brake pads in a non-worn-out state clamp the brake disk.
Figure 11:
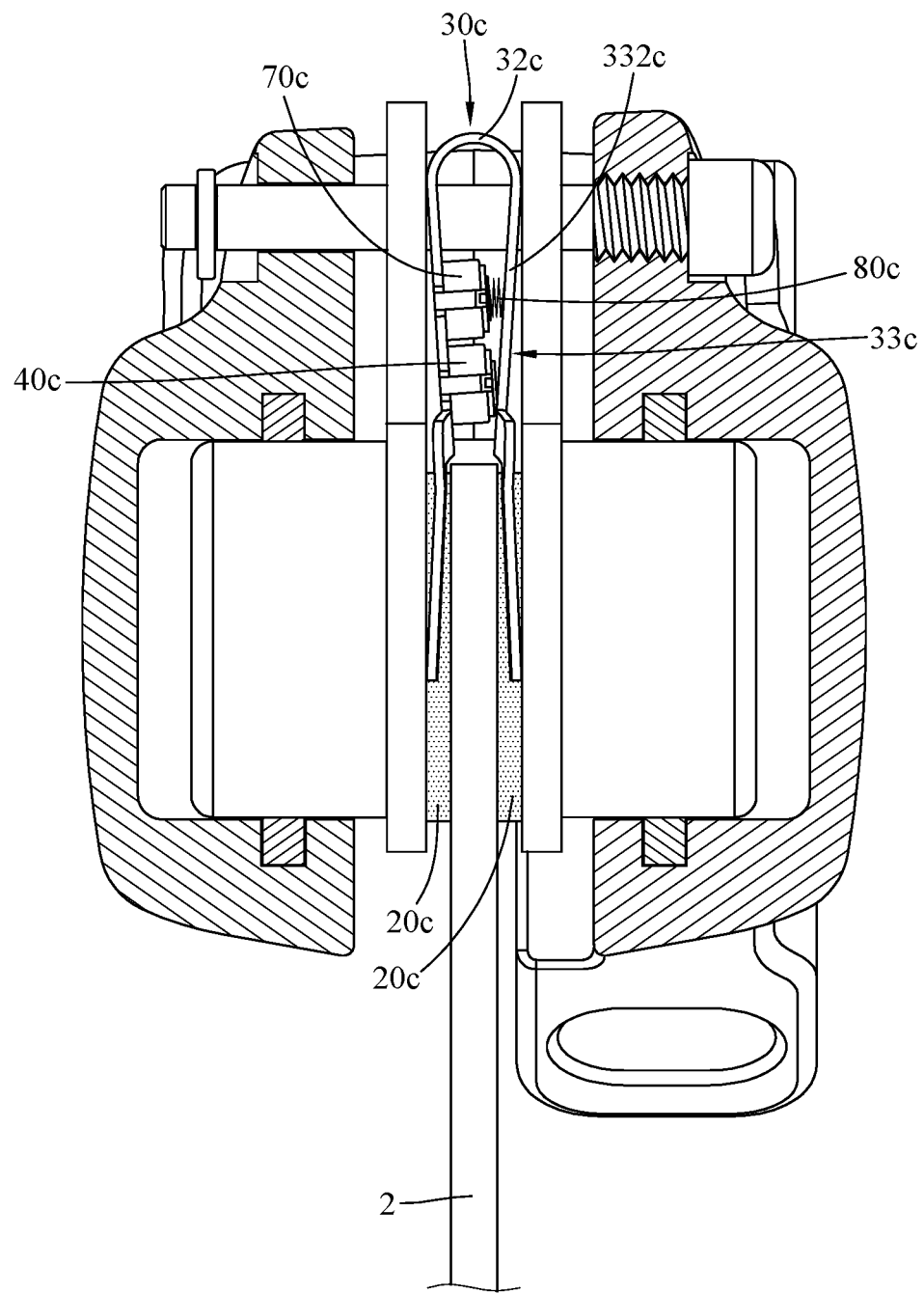
FIG. 11 is a partial cross-sectional view of the brake disk and the wear warning device in FIG. 10 when the brake pads in a worn-out state clamp the brake disk.

In this embodiment, the position of the second switch 70*b* is not restricted either. For example, please refer to FIGS. 10 and 11, FIG. 10 is a partial cross-sectional view of a brake disk and a wear warning device according to a fourth embodiment of the disclosure when brake pads in a non-worn-out state clamp the brake disk, and FIG. 11 is a partial cross-sectional view of the brake disk and the wear warning device in FIG. 10 when the brake pads in a worn-out state clamp the brake disk.

This embodiment provides a wear warning device similar to the wear warning device shown in FIG. 8. Therefore, only the differences between them will be described in the following sentences. In this embodiment, a second switch 70*c* is located closer to a connection part 32*c* of an elastic component 30*c* than a first switch 40*c*. As shown in FIG. 10, when two brake pads 20*c* in the non-worn-out state clamp the brake disk 2, an elastic contact component 80*c* activates the second switch 70*c* located above the first switch 40*c* to produce a brake warning signal. At this moment, the two brake pads 20*c* respectively have sufficient thicknesses, such that a second plate portion 332*c* of a second arm part 33*c* is unable to activate the first switch 40*c*. Then, as shown in FIG. 11, when the two brake pads 20*c* in the worn-out state clamp the brake disk 2, the first switch 40*c* located below the second switch 70*c* can be activated by the second plate portion 332*c* of the second arm part 33*c* due to the smaller thicknesses of the brake pads 20c. In such a case, the first switch 40c and the second switch 70c can be activated to respectively produce a wear warning signal and the brake warning signal.

In the aforementioned embodiments, the first switch is located above or below the second switch, but the present disclosure is not limited thereto; in some other embodiments, a distance between the first switch and the connection part of the elastic component may be equal to a distance between the second switch and the connection part of the elastic component; that is, the first switch and the second switch are arranged side by side in the same altitude. In such a case, the first switch and the second switch can be activated via the same manner as discussed above, thus the following paragraphs will not be repeatedly explained hereinafter.

Figure 12:
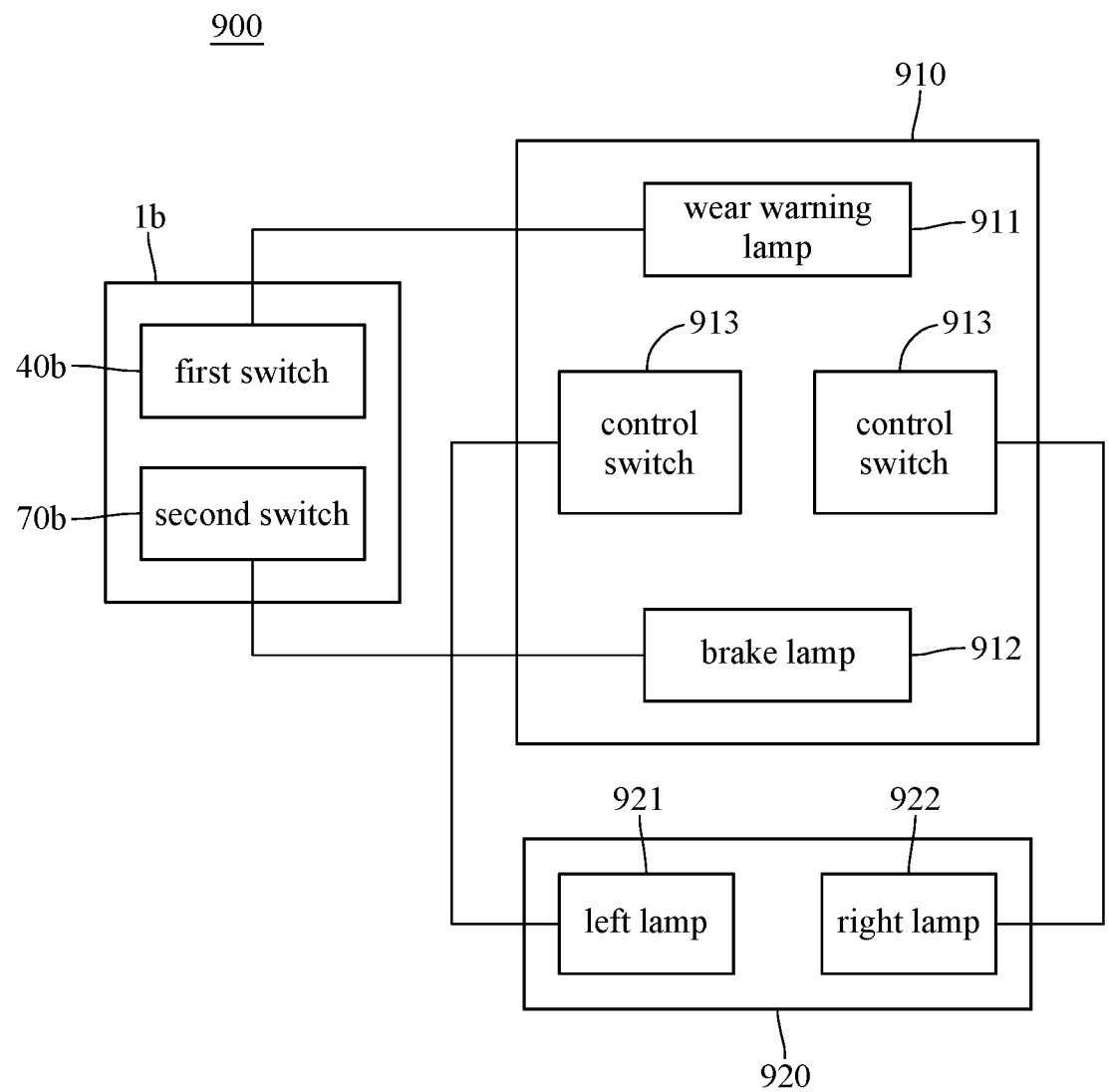
FIG. 12 is a schematic view of a warning system according a fifth embodiment of the disclosure.

The above wear warning devices all can be applied to a warning system. For example, please refer to FIG. 12, and FIG. 12 is a schematic view of a warning system according a fifth embodiment of the disclosure.

This embodiment provides a warning system 900 that can be applied to a bicycle. The warning system 900 includes the wear warning device 1b of the third embodiment, a brake lever 910 and a direction lamp 920. The brake lever 910 has a wear warning lamp 911, a brake lamp 912 and two control switches 913.

The first switch 40b of the wear warning device 1b is electrically connected to the wear warning lamp 911, and the second switch 70b is electrically connected to the brake lamp 912. The wear warning signal produced by the first switch 40b and the brake warning signal produced by the second switch 70b can be respectively transmitted to the wear warning lamp 911 and the brake lamp 912 by a wireless transmission manner. As such, a user can determine whether the brake pads (shown in FIG. 8) are required to be changed according to the light of the wear warning lamp 911 on the brake lever 910.

In addition, the two control switches 913 are respectively and electrically connected to a left lamp 921 and a right lamp 922 of the direction lamp 920. Signals respectively produced by the two control switches 913 can be respectively transmitted to the left lamp 921 and the right lamp 922 via a wireless transmission manner, and the signals are respectively configured to turn on the left lamp 921 and the right lamp 922 of the direction lamp 920.

In this embodiment, the signals respectively produced by the first switch 40b, the second switch 70b and the two control switches 913 are all transmitted via a Bluetooth transmission manner, but the present disclosure is not limited thereto; in some other embodiments, those signals may be transmitted via an infrared transmission manner or another wireless transmission manner. Moreover, those signals may also be transmitted via a wire transmission manner.

Note that other wear warning device discussed in the above embodiments all can be incorporated into the warning system 900. For example, in some other embodiments, the warning system may adopt one of the wear warning devices as discussed above. However, in the wear warning device 1 of the first embodiment, there is no switch for controlling the brake lamp, thus, in such a case, the brake lamp can be controlled by an additional reed switch.

According to the wear warning devices and the warning system, when the two brake pads in the worn-out state clamp the brake disk, the first arm part and the second arm part that moved with the brake pads can activate the first switch and thus sending out a wear warning signal to warn the user that the two brake pads are about to be or have been worn out.

In addition, in some embodiments, the first switch is the two-step switch, or the wear warning device further have the second switch, such that the first switch or the second switch can be activated to produce the brake warning signal when the brake pads in the non-worn-out state or the worn-out state clamp the brake disk, thus the brake lamp can be turn on to warning behind vehicles.

Furthermore, the brake lever has the wear warning lamp, such that the user can determine whether the brake pads are required to be changed according to the light of the wear warning lamp on the brake lever.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A wear warning device, configured to be disposed near a brake disk, comprising:
   a caliper, having an accommodation space, a first wall surface, a second wall surface and two push parts, wherein the first wall surface and the second wall surface are located on two opposite sides of the accommodation space, and the two push parts are respectively disposed at the first wall surface and the second wall surface and are movable close to or away from each other;
   two brake pads, located in the accommodation space and located between the two push parts, wherein the two brake pads have a non-worn-out state or a worn-out state;
   an elastic component, comprising a first arm part, a connection part and a second arm part, wherein the connection part is connected to and located between the first arm part and the second arm part, and the first arm part and the second arm part are respectively disposed on the two brake pads; and
   a first switch, disposed on the first arm part and located between the first arm part and the second arm part;
   wherein when the two brake pads are in the non-worn-out state and the two push parts are moved toward each other to force the two brake pads to clamp the brake disk and to force the first arm part and the second arm part to move toward each other, the second arm part does not activate the first switch to produce a wear warning signal; when the two brake pads are in the worn-out state and the two push parts are moved toward each other to force the two brake pads to clamp the brake disk and to force the first arm part and the second arm part to move toward each other, the second arm part activates the first switch to produce the wear warning signal;
   wherein the first arm part has a first engagement structure, the first switch has a second engagement structure, the second engagement structure is engaged with the first engagement structure.

2. The wear warning device according to claim 1, wherein the first engagement structure comprises two positioning pawls, the two positioning pawls extend toward the second arm part, the second engagement structure comprises two positioning recesses, the two positioning pawl are respectively engaged with the two positioning recesses.

3. The wear warning device according to claim 2, wherein the first engagement structure further comprises a positioning hole, the positioning hole are located between the two positioning pawls, the second engagement structure further comprises a positioning protrusion, the positioning protrusion is located between the two positioning recesses, and the positioning protrusion is inserted into the positioning hole.

4. The wear warning device according to claim 1, further comprising a wireless transmission device, wherein the first switch is electrically connected to the wireless transmission device.

5. The wear warning device according to claim 4, further comprising an oil inlet tube, wherein the oil inlet tube is connected to the caliper, the wireless transmission device has a mount portion, and the wireless transmission device is mount on the oil inlet tube via the mount portion.

6. The wear warning device according to claim 1, wherein the first switch is a two-step switch; when the two brake pads are in the non-worn-out state and the two push part are moved toward each other to force the two brake pads to clamp the brake disk and to force the first arm part and the second arm part to move toward each other, the second arm part activates the first switch to produce a brake warning signal.

7. The wear warning device according to claim 1, further comprising a second switch and an elastic contact component, wherein the second switch is disposed on the first arm part and is located between the first arm part and the second arm part, the elastic contact component is disposed on the second arm part and is located between the first arm part and the second arm part; when the two brake pads are in non-worn-out state and the two push parts are moved toward each other to force the two brake pads to clamp the brake disk and to force the first arm part and the second arm part to move toward each other, the elastic contact component activates the second switch to produce a brake warning signal.

8. The wear warning device according to claim 7, wherein the first switch is located closer to the connection part of the elastic component than the second switch.

9. The wear warning device according to claim 7, wherein the second switch is located closer to the connection part of the elastic component than the first switch.

10. The wear warning device according to claim 7, wherein a distance between the first switch and the connection part of the elastic component is equal to a distance between the second switch and the connection part of the elastic component.

11. A warning system, comprising:
a brake lever, having a wear warning lamp and a brake lamp; and
the wear warning device according to claim 7, wherein the first switch of the wear warning device is electrically connected to the wear warning lamp, and the second switch of the wear warning device is electrically connected to the brake lamp.

12. The warning system according to claim 11, wherein the wear warning signal produced by the first switch and the brake warning signal produced by the second switch are respectively transmitted to the wear warning lamp and the brake lamp via a wireless transmission manner or a wire transmission manner.

13. The warning system according to claim 11, further comprising a direction lamp, wherein the brake lever has two control switches, and signals respectively produced by the two control switches are transmitted to the direction lamp via a wireless transmission manner or a wire transmission manner.

14. A warning system, comprising:
a brake lever, having a wear warning lamp; and
the wear warning device according to claim 1, wherein the first switch of the wear warning device is electrically connected to the wear warning lamp.

15. The warning system according to claim 14, wherein the wear warning signal produced by the first switch is transmitted to the wear warning lamp via a wireless transmission manner or a wire transmission manner.

16. The warning system according to claim 14, further comprising a direction lamp, wherein the brake lever has two control switches, and signals respectively produced by the two control switches are transmitted to the direction lamp via a wireless transmission manner or a wire transmission manner.

17. A wear warning device, configured to be disposed near a brake disk, comprising:
a caliper, having an accommodation space, a first wall surface, a second wall surface and two push parts, wherein the first wall surface and the second wall surface are respectively located on two opposite sides of the accommodation space, and the two push parts are respectively disposed at the first wall surface and the second wall surface and are movable close to or away from each other;
two brake pads, located in the accommodation space and located between the two push parts;
an elastic component, comprising a first arm part, a connection part and a second arm part, wherein the connection part is connected to and located between the first arm part and the second arm part, and the first arm part and the second arm part are respectively disposed on the two brake pads; and
a first switch, disposed on the first arm part and located between the first arm part and the second arm part;
wherein when the two push parts are moved toward each other to force the two brake pads to clamp the brake disk and to force the first arm part and the second arm part to move toward each other, the second arm part activates the first switch to produce a signal;
wherein the first arm part has a first engagement structure, the first switch has a second engagement structure, the second engagement structure is engaged with the first engagement structure.

18. A wear warning device, configured to be disposed near a brake disk, comprising:
an elastic component, comprising a first arm part, a connection part and a second arm part, wherein the connection part is connected to and located between the first arm part and the second arm part, the first arm part comprises a first extension arm portion and a first plate portion connected to each other, the second arm part comprises a second extension arm portion and a second plate portion connected to each other, two opposite ends of the first plate portion are respectively connected to the first extension arm portion and the connection part, two opposite ends of the second plate portion are respectively connected to the second extension arm portion and the connection part, and the first plate portion has a fixing structure; and
a first switch, disposed on the fixing structure, wherein when the first arm part and the second arm part are moved toward each other, the second plate portion of the second arm part activates the first switch to produce a signal;
wherein the fixing structure is a first engagement structure, the first switch has a second engagement structure, the second engagement structure is engaged with the first engagement structure.

19. The wear warning device according to claim 18, wherein the first plate portion and the second plate portion faces each other and form an inner area therebetween, and the first switch is located in the inner area.

\* \* \* \* \*